United States Patent [19]

Nouchi et al.

[11] 4,362,767
[45] Dec. 7, 1982

[54] MAGNETIC THIN FILM AND METHOD OF MAKING IT

[75] Inventors: Norimoto Nouchi, Katano; Kenji Kanai, Neyagawa; Nobuyuki Kaminaka, Moriguchi; Noboru Nomura, Kyoto, all of Japan

[73] Assignee: Matsushita Electric Industrial Co., Ltd., Japan

[21] Appl. No.: 96,562

[22] Filed: Nov. 21, 1979

[30] Foreign Application Priority Data

Nov. 22, 1978 [JP] Japan ................................. 53-144836

[51] Int. Cl.$^3$ .......................... G11B 5/64; G11B 5/84
[52] U.S. Cl. .................................. 427/130; 427/128; 427/255.3; 427/350; 118/726; 428/900; 252/62.56; 252/62.6
[58] Field of Search ............ 427/132, 128, 130, 248.1, 427/255.2, 255.5, 350; 423/633, 634; 252/62.56, 62.6; 118/726; 428/900, 694; 360/134, 135, 136

[56] References Cited

U.S. PATENT DOCUMENTS

| 3,859,129 | 1/1975 | Chen et al. ........................... 427/130 |
| 4,156,037 | 5/1979 | Hattori et al. ....................... 427/132 |
| 4,170,689 | 10/1974 | Katsui et al. ....................... 427/130 |
| 4,211,803 | 7/1980 | Cowher et al. ..................... 427/128 |
| 4,232,061 | 11/1980 | Hattori ............................ 204/142 M |
| 4,236,946 | 12/1980 | Aboaf ............................. 204/192 M |

FOREIGN PATENT DOCUMENTS 52-12912  6/1978  Japan .................................. 427/128

Primary Examiner—Stanley S. Silverman
Attorney, Agent, or Firm—Wenderoth, Lind & Ponack

[57] ABSTRACT

A magnetic thin film is composed of an oxide of $Fe_xCo_yCu_z$ having spinel structure wherein x, y and z represent respective atomic ratios, $x+y+z=1$, $0.50 \leq x < 0.95$, $0.05 < y \leq 0.30$ and $0 \leq z < 0.20$. Such film exhibits high coercive force and good squareness.

The film is made by vapor depositing a material containing at least one of $Fe_xCo_yCu_z$ alloys and oxides thereof onto a substrate held at a temperature between 200° and 500° C. under an oxygen atmosphere with the pressure of above $10^{-4}$ Torr but below $10^{-3}$ Torr.

3 Claims, 1 Drawing Figure

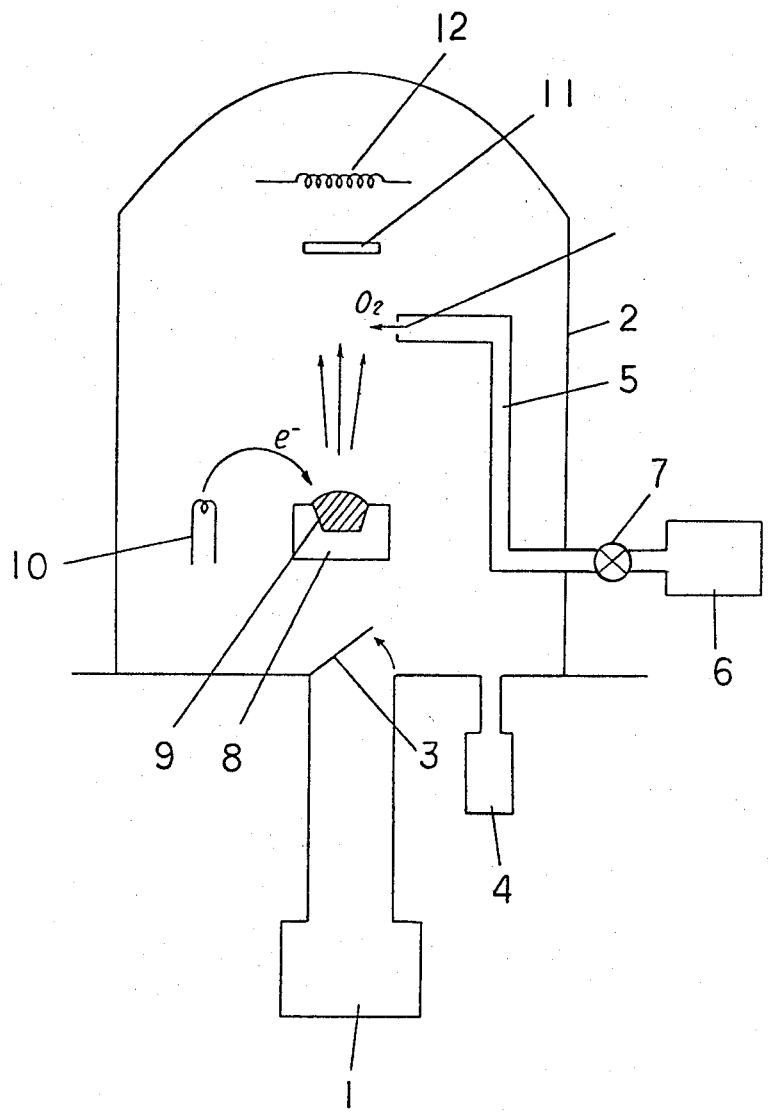

MAGNETIC THIN FILM AND METHOD OF MAKING IT

BACKGROUND OF THE INVENTION

The present invention relates to a magnetic thim film and more particularly to such film including iron oxide as a principal component, and method of making it.

The magnetic thin film is used, for example, as the permanent magnet for biasing the magnetoresistive element of magnetoresistive transducers or as magnetic recording media such as magnetic discs, magnetic tapes, etc.

The requirements of magnetic thin film for biasing the magnetoresistive (hereinafter referred to as MR) element in an MR head are as follows:

To improve an adequate biasing magnetic field, a large residual magnetic flux density $B_r$ is required. If as the MR element, for example, a Permalloy film of 83% Ni-17% Fe being uniaxially anisotropic and having a saturation magnetic flux density Bs of $10^4$ G, is used and formed to a thickness of $t_{mr}$ μm on a non-magnetic substrate of silicon, glass, alumina, etc., the product of the thickness $t_b$ μm and the residual magnetic flux density $B_r$ of the magnetic thin film should meet the following condition:

$$B_r t_b > 10^4 t_{mr} [G \cdot \mu m] \qquad (I)$$

If the substrate is of a soft magnetic material such as ferrite, Sendust, Permalloy, etc., roughly the following condition is required in place of (I):

$$B_r t_b > 2 \times 10^4 t_{mr} [G \cdot \mu m] \qquad (II)$$

To prevent the demagnetization by the recording media such as magnetic tape, the magnetic thin film is required to have high coercive force. If as the recording media, for example, $\gamma$-$Fe_2O_3$ base magnetic tape is used, the coercive force $H_c$ of the magnetic thin film should meet the following condition:

$$H_c > 500 Oe \qquad (III)$$

If a metal alloy tape with the coercive force of 2,000 Oe are used as the recording media, the following condition is required place of (III):

$$H_c > 2,000 Oe \qquad (IV)$$

Besides the above-mentioned properties, the large specific resistance is also required. Further the surface of the magnetic thin film should be flat, having no cracks or recesses. If the film has such a defective surface, the surface of the MR element formed on the film will also have such cracks or recesses, giving rise to formation of many magnetic segments in the MR element, causing Barkhausen noise in the output signal of the MR head.

When the magnetic this film is used as the recording medium such as magnetic disc, magnetic tape, etc. in digital recording at about 10,000 to 20,000 B.P.I., for example, $H_c$ should be around 500 Oe, and $B_r t_b$, around 1,000 G·μm (therefore if the film thickness is 0.5 μm, $B_r$ should be 2,000 G, for example).

Hithereto known magnetic thin films available for above-mentioned usages are principally iron oxide base films. However they could not sufficiently satisfy the above-mentioned condition, particularly the very high coercive force.

As for the method of manufacturing the oxide magnetic film film, of the many methods available, the reactive evaporation process is most popular because of its advantage in that manufacturing is possible at relatively low temperature, and it needs a small number of manufacturing steps. However such method involves a troublesome step such as having to anneal the thin film formed by vapor deposition in air for a long time i.e. more than 10 hours. And it is also disadvantageous that during such long time annealing, dust in the air or dirt is deposited on the film, badly affecting subsequent lamination of other films.

SUMMARY OF THE INVENTION

It is an object of the invention to provide a magnetic thin film having improved properties advantageous for the use as a magnetic biasing layer of MR head or magnetic recording media.

It is further object of the invention to provide a method of making such film, which can easily be performed, giving good properties to the film.

In Applicant's invention, the magnetic thin film comprises an oxide of $Fe_xCo_yCu_z$ having spinel structure wherein x, y and z represent respective atomic ratios, $x+y+z=1$, $0.50 \leq x < 0.95$, $0.05 < y \leq 0.30$, and $0 \leq z < 0.20$.

A method of making such film according to the invention is as follows:

At least one of $Fe_xCo_yCu_z$ alloys and oxides thereof is prepared as a deposition material. The deposition material is vapor deposited onto a substrate held at the temperature between 200° and 500° C. under oxygen atmosphere with the pressure of above $10^{-4}$ Torr but below $10^{-3}$ Torr.

To improve the squareness of the magnetic thin film, annealing after deposition may be carried out.

BRIEF DESCRIPTION OF THE DRAWING

The FIGURE is a schematic diagram of the apparatus used in manufacturing the magnetic thin film by the method embodying the invention.

DETAILED DESCRIPTION

A magnetic thin film according to the invention contains Fe as a principal component and Co as an additive. Cu is added to achieve greater improvement. They are deposited as oxides having a spinel structure.

The effects of varying the contents of Co or Cu on the characteristics of the magnetic thin film are as follows.

In the following description the atomic ratios of Fe, Co and Cu to the total content of them are represented by x, y and z, respectively, i.e., $x+y+z=1$.

In the magnetic characteristics of the magnetic thin films of the oxides having the compositions for $z=0$, that is, the oxides of Fe with addition of only Co, the coercive force $H_c$ increases with increasing amounts of Co. For the oxide of Fe without the addition of Co, the $H_c$ runs at 200 to 300 Oe, but when Co is added in the atomic ratio y of 0.05, it reaches 500 Oe.

On the other hand, the saturation magnetic flux density $B_s$ is about 6,000 G for iron oxide without the addition of Co; this value declines with increasing amounts of Co added; and if Co is added in the atomic ratio y higher than 0.3, the residual magnetic flux density becomes such that it is insufficient for imposing the biasing magnetic field on the MR element. Accordingly the addition of Co is appropriate in an atomic ratio y above 0.05 but below 0.3.

To be sure, one of the characteristic features of this invention is that by the addition of Cu to the oxide of Fe and Co, some bulging is brought about on part of the B-H curve in the second quadrant. Therefore the magnetic thin film of such material is not much decreased in magnetization by the magnetic field due to magnetic tapes etc., thus well preserving the initially magnetized condition. With the addition of Cu in an amount Z of 0.05, the effect becomes apparent, but the amount Z higher than 0.2 is not desirable, because in such composition the saturation magnetic flux density $B_s$ and thus residual magnetic flux density $B_r$ are small.

Hereinafter a method of manufacturing the film embodying this invention is described. The method includes reactive evaporation process and is carried out with an apparatus illustrated in the FIGURE.

Referring to the FIGURE, numeral 1 represents a evacuating device such as a rotary pump and oil diffusion pump, etc. which is connected with a vacuum container 2 through a main valve 3. To the container 2, a vacuum gauge 4 is also connected. A gas lead-in pipe 5 is provided in container 2 and one end thereof protrudes out of the container, being connected with an oxygen gas cylinder 6 through a needle valve 7. In the container 2 is provided a hearth 8 for supporting a deposition material 9. A tungsten filament 10 is provided near the hearth 8. Numeral 11 represents a substrate on which the magnetic thin film is deposited. A heater 12 is located above the substrate 11 for keeping the substrate 11 at a specified temperature.

The manufacturing of a magnetic thin film with the use of above-mentioned apparatus is carried out as follows.

After setting the deposition material 9 and the substrate 11, the container is evacuated to a high level of vacuum such as on the order of $10^{-5}$ to $10^{-6}$ Torr by evacuating device 1. As the deposition material, $Fe_x Co_y Cu_z$ alloy (wherein $x+y+z=1$), the oxide thereof, or the mixture of the alloy and the oxide is used. Then the needle valve 7 is opened to introduce the oxygen gas in the cylinder 6 into the container 2. While adjusting the needle valve 7 or the main valve 3 so that the vacuum gauge 4 will give the degree of vacuum at the specified value, vapor deposition is carried out as follows. The hearth 8 is electrically held at the ground potential and filament 10 is held at a high negative potential. The deposition material 9 is dissolved and evaporated by the thermal electrons emitted from the filament 10, and thus is deposited on the substrate 11.

Then thus obtained film is subjected to annealing for increasing squareness.

With regard to the magnetic characteristics of the magnetic thin film, the conditions of the vapor deposition, that is, oxygen pressure, the substrate temperature and the deposition rate etc., are closely interrelated.

The preferred conditions on above-mentioned vapor deposition are as follows.

The degree of vacuum, i.e., the oxygen gas pressure $P_{o2}$ (D) obtained by controlling the needle valve 7 should be such that $10^{-4} \leq P_{o2}(D) < 10^{-3}$ Torr. Such condition is based on the consideration of the life expectancy of the evacuating device 1 and the range where control of the oxygen pressure is readily available.

The substrate temperature $T_d$ is preferably in the range between 200° to 500° C. When comparisons are made between the substrate temperature $T_d$ in the low temperature range around 200° C. and in the high range around 400° C., with the deposition rate being kept the same, the coercive force $H_c$ tends to be larger at the lower temperature, but the saturation magnetic flux density $B_s$ and the residual magnetic flux density $B_r$ tend to be larger at the higher temperature. For this reason, to satisfy both conditions (I) and (III) hereinbefore defined, the lower limit of the substrate temperature should be 200° C., with the higher limit, 500° C., at a deposition rate between 10 and 30 Å/sec. Furthermore, in order to minimize the change in characteristics of the magnetic thim film due to heat during the following laminating of MR element thereon, the substrate temperature $T_d$ higher than 200° C. is preferable. This is because substrate temperature higher than 200° C. is required in deposition of an MR element such as Permalloy film.

As for the deposition rate which is represented by the thickness of deposited film produced per unit time, it is preferably in the range of from 10 to 30 Å/sec. If the electric power for emitting thermal electrons from the tungsten filament 10 is increased under the constant oxygen pressure, the amounts of atoms or the molecules flying from the material being deposited 9 increases, resulting in the increase of the deposition rate. Through such method of controlling the deposition rate, the films obtained at a low deposition rate, i.e., 10 to 30 Å/sec and at a high rate, i.e., on the order of 60 Å/sec, are compared. When the film is formed at a high rate, there is the probability of some impurities being taken into the film from inside the hearth or the neighborhood thereof, resulting in unsatisfactory characteristics, and there is also the probability of wide dispersion in the characteristics of the films produced.

Next, the preferred conditions on above-mentioned annealing of the deposited film are described.

Annealing should be performed under the oxide pressure $P_{o2}(A)$ in the range higher than $10^{-4}$ Torr but lower than when exposed to air by breaking vacuum, i.e., $10^{-4} \leq P_{o2}(A) < 760 \times (1/5)$[Torr], in which the factor (1/5) designates the ratio of the partial pressure of oxygen to the atmospheric pressure. The longer the annealing time, the greater the effect of improving the squareness. But annealing for 18 to 30 minutes is proper. The substrate temperature during annealing, $T_d(A)$, should be held at the same temperature as the substrate temperature $T_d$ during the deposition or higher. The higher the substrate temperature $T_d(A)$, the larger the effect of annealing. But since the film is liable to crack or be indented at high temperature, the temperature should be lower than 500° C.

In the following, the present invention is described in conjunction with its embodiments.

EXAMPLE 1

The following table depicts the change of characteristics of the magnetic thin film of $Fe_x Co_y$ oxide having a spinel structure, according to the variation of y.

TABLE

| Atomic ratio of Co | $H_c$ (Oe) | $B_r$ (G) | $B_s$ (G) |
| --- | --- | --- | --- |
| 0 | 200 | 3600 | 6000 |
| 0.05 | 500 | 2400 | 4000 |
| 0.10 | 1000 | 2100 | 3500 |
| 0.20 | 1500 | 1800 | 3000 |
| 0.30 | 2000 | 1500 | 2000 |

The conditions of vapor deposition were: The substrate temperature $T_d$ was 350° C.; the deposition rate, 15 to 30 Å/sec; the oxygen pressure $P_{o2}(D)$, $2\times10^{-4}$ Torr; and the thickness of the deposited film, 0.3 μm.

The films were not subjected to the annealing.

As for the case where the film was composed only of the oxide of element Fe, as shown in the table, the saturation magnetic flux density $B_s$ was 6,000 G, but the coercive force $H_c$ was a small value such as 200 Oe. Therefore when the films was used as the biasing material for MR head, the demagnetization due to the magnetic field from the magnetic tape was remarkable. On the other hand, when $C_o$ was added in an amount such that an atomic ratio of y 0.1, the film retained sufficient magnetic field through such use.

EXAMPLE 2

$Fe_{0.90}Co_{0.10}$ was used as the deposition material. And vapor deposition was carried out at the deposition rate of 15 to 30 Å/sec, the oxygen pressure $P_{o2}(D)$ of $2\times10^{-4}$ Torr and the substrate temperature of 350° C., and thus the film of Fe-Co oxide was formed. Then without breaking the vacuum, the oxygen gas pressure $P_{o2}(A)$ was held at $8\times10^{-4}$ Torr by adjusting the needle valve 7 and the main valve 3. And while keeping the substrate temperature at 350° C., the annealing was carried out for 30 minutes.

The thus produced magnetic thin film of $Fe_{0.90}Co_{0.10}$ oxide having a spinel stucture exhibited a coercive force $H_c$ of 3,000 Oe, a residual magnetic flux density $B_r$ of 2,800 G and a saturation magnetic flux density $B_s$ of 3,500 G. This film exhibited satisfactory results as the biasing material for MR heads even if a metal alloy tape was used as the recording medium.

EXAMPLE 3

An oxide film of $Fe_{0.85}Co_{0.10}Cu_{0.05}$ having a spinel structure was obtained by depositing an alloy containing the components of Fe, Co and Cu under the same conditions as in Example 1.

While the saturation magnetic flux density and the coercive force of this film were similar to those of $Fe_{0.90}Co_{0.10}$ oxide, the squareness and the bulge of the B-H curve in the second quadrant were larger than those of $Fe_{0.90}Co_{0.10}$ oxide. This film exhibited stable performance for a long time.

In the foregoing, the magnetic thin films of this invention are exemplified as the biasing material of MR heads, but they may be adequately employed as magnetic recording media in magnetic tapes, magnetic discs, etc.

What is claimed is:

1. A method of making a magnetic thin film consisting essentially of the steps of:
   (a) preparing a deposition material including at least one of $Fe_xCo_yCu_z$ alloys and oxides of said alloys, wherein x, y and z represent the respective atomic ratios, $x+y+z=1$, $0.50 \leq x < 0.95$, $0.05 < y \leq 0.30$ and $0 < z \leq 0.20$;
   (b) in a container, vapor depositing a film of said deposition material into a substrate held at a temperature between 200° and 500° C. under oxygen pressure in the range above $10^{-4}$ Torr, but below $10^{-3}$ Torr; and,
   (c) annealing said deposited film for at least 18 minutes under an oxygen pressure above $10^{-4}$ Torr, but below $760\times(1/5)$ Torr, with said substrate being held at a temperature between 200° and 500° C.

2. The method according to claim 1 wherein the annealing step is performed in the same container as the vapor deposition step.

3. The method according to any one of claims 2 or 1 wherein the resultant film exhibits a coercive force (Hc) of 3000 Oe.

* * * * *